INVENTORS
THEODORE TRECKER
JOSEPH B. ARMITAGE
By W. D. O'Connor
ATTORNEY

Patented Jan. 20, 1948

2,434,751

UNITED STATES PATENT OFFICE 2,434,751

MACHINE TOOL

Theodore Trecker, Milwaukee, and Joseph B. Armitage, Wauwatosa, Wis., assignors to Kearney & Trecker Corporation, West Allis, Wis., a corporation of Wisconsin Application December 26, 1942, Serial No. 470,130

7 Claims. (Cl. 90—15)

This invention relates, generally, to machine tools and more particularly to improvements in milling machines of the multiple spindle type.

A general object of the invention is to provide an improved milling machine particularly adapted to effect a plurality of machining operations simultaneously.

Another object of the invention is to provide improved supporting and actuating apparatus for the cutters of a milling machine.

Another object of the invention is to provide an improved machine tool arranged to effect machining operations simultaneously along angularly disposed paths.

Another object of the invention is to provide a milling machine having an improved arrangement for moving a milling cutter transversely of the path of feeding movement of the work table.

Another object is to provide improved means for effecting transverse feeding movements of a milling cutter in correlation with longitudinal feeding movements of a work support.

Another object is to provide in a milling machine having a plurality of cutter spindles one of which is arranged for transverse feeding movement, a control mechanism arranged to prevent movement of the transversely fed spindle into collision with the other spindles of the machine.

According to this invention, a milling machine of the rail type is provided with a plurality of cutter carrying spindles mounted on the machine rail in an improved manner for effecting a plurality of machining cuts simultaneously upon a work piece. The spindle supporting rail may be vertically adjustable in the usual manner and carries the usual horizontally adjustable spindle heads provided with vertically disposed spindles. In addition, the rail carries a vertically slidable self-contained spindle head preferably provided with an angularly disposed spindle. Furthermore, there are slidably mounted directly in the rail a plurality of vertically disposed spindle quills carrying cutter driving spindles which are connected to be actuated by a motor mounted on the rail. As an important feature of the invention, an improved arrangement is provided for moving one of the spindle heads transversely in synchronism with the work table as it is advanced in a feeding movement. To effect definite correlation between movement of the table and of the cutter head, the head traversing mechanism is driven directly from the table in the course of its movement.

The traversing mechanism includes a rate changing and reversing transmission that may be, conveniently, of the pick-off gear type, whereby an adjustment may be made as to the direction and extent of the transverse movement to effect a cutting operation at the desired angle upon a work piece. The transmission mechanism is preferably driven by a rack carried by the table and engaging a pinion connected to turn the pick-off gearing, a screw and nut device being driven by the gearing to move the cutter head. In order that the cut may be made along the desired path, the cutter head is adjustable to present a milling cutter with its plane of rotation positioned to include the line of cutting action. To prevent the transversely moving spindle head from colliding with another head on the rail, a suitable limit switch mechanism is associated with the head and arranged to stop feeding movement of the work table when the moving head arrives at a predetermined position relative to another head on the rail.

The foregoing and other objects of this invention, which will be more fully apparent from the following description, may be achieved by means of the exemplifying apparatus shown in and described in connection with the accompanying drawing, in which.

Figure 1:
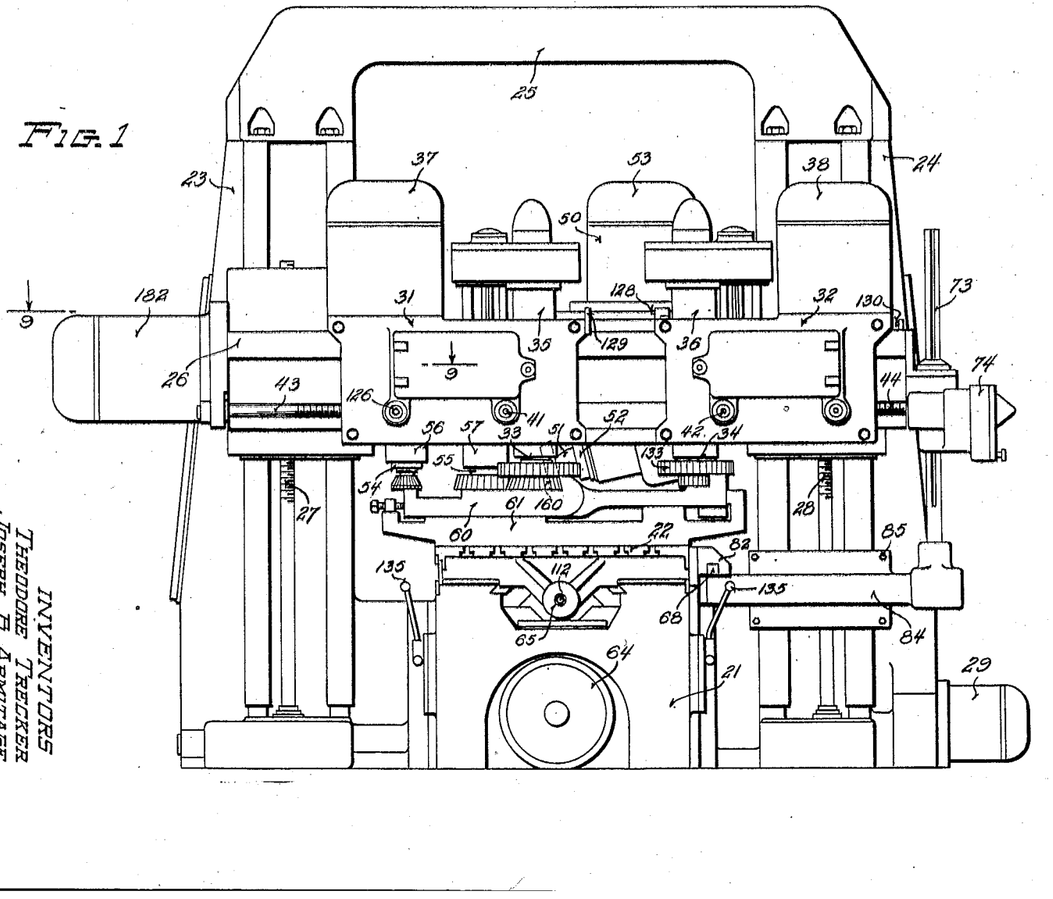
Figure 1 is a view in right end elevation of a large milling machine of the rail type, embodying the various features of this invention.
Figure 2:
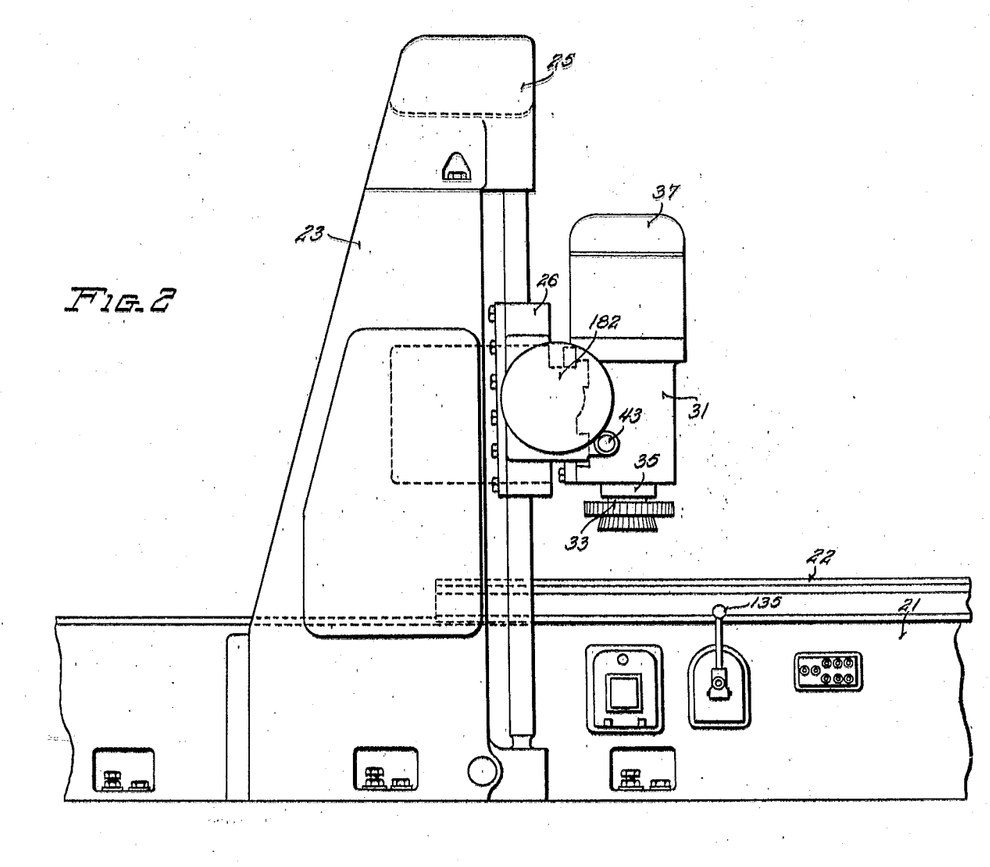
Fig. 2 is a view in front elevation of the machine shown in Fig. 1, the ends of the base and part of the work table having been broken away.

The particular machine tool set forth herein as illustrative of apparatus embodying the several characteristics of the present invention in a practical operative form, is a milling machine of the multiple spindle, rail type, as may best be seen by reference to Figs. 1 and 2 of the drawing in which the entire machine is shown in right end and front elevations, respectively.

Referring more particularly to these figures of the drawing, the milling machine there shown comprises essentially a relatively long hollow base or bed 21 constituting the frame or foundation upon which the usual work supporting table 22 is slidably mounted for longitudinal movement. Uprising from the bed at the sides of the table are a front column 23 and a rear column 24 fastened together at the top by a tie rail or cross member 25 to constitute a rigid upstanding supporting structure for a vertically adjustable cutter spindle carrying rail 26. As shown, the rail 26 is slidably mounted at its ends on the right sides of the columns or uprights 23 and 24 and is arranged to be adjusted vertically therealong by elevating screws 27 and 28 associated with the respective columns and operatively connected to be actuated simultaneously by an elevating motor mounted at the base of the rear column.

As best shown in Fig. 1, the rail 26 has slidably mounted for horizontal movement on its right side or face, a pair of spindle carrying heads 31 and 32 of similar construction but oppositely arranged. The spindle heads 31 and 32 support cutter carrying spindles 33 and 34, respectively, which are vertically disposed within quills 35 and 36 that are slidably mounted in the heads for vertical axial adjustment, the spindles being driven by motors 37 and 38, respectively, that are mounted on the heads and are operatively connected to the spindles by speed changing gearing in the usual manner.

The spindle quills 35 and 36 and their associated spindles may be adjusted vertically within the spindle heads by means of a hand crank (not shown) or the like that may be applied to the square ends of actuating shafts 41 and 42, respectively, which project from the fronts of the heads. In order to adjust the spindles in direction transverse to the direction of movement of the table 22, the spindle heads are arranged to be moved along the rail 26 by means of independent traversing screws 43 and 44 respectively. By these two adjustments, milling cutters carried by the spindles 33 and 34 may be positioned vertically toward or from the table 22 and traversed horizontally transversely of the table, each movement being independent of the other.

Another spindle head 50 is mounted on the left side of the rail 26, toward the rear of the machine. This head differs from the heads 31 and 32 in that it is mounted in a manner to provide for vertical sliding movement only relative to the rail. The vertically adjustable head 50 in this instance is provided with an angularly disposed tool carrying spindle 51 mounted in an axially adjustable quill 52 operatively connected to be driven by a motor 53 mounted on the head.

Two other cutter carrying spindles 54 and 55 are supported by the rail 26 for bodily movement with it, there being no intermediate head structure. These spindles are fitted in vertically disposed quills 56 and 57, respectively, which are slidably mounted directly in an expanded part of the rail 26 near its forward end for vertical axial adjustment.

Referring particularly to Fig. 1, it will be seen that the several spindles are each provided with a cutter and that the cutters are arranged to perform a multiplicity of machining operations simultaneously upon a work piece 60 which is supported upon the work table 22 by means of a suitable fixture 61.

In preparing to effect a multiple machining operation upon the work piece 60, the spindle carrying rail 26 is first adjusted vertically along the columns to bring it into an approximate relationship with the work piece for proper operation of the various cutters. Each of the several cutter spindles is then adjusted independently to position its associated cutter precisely for effecting the desired machining operation.

According to an important feature of this invention, arrangements are made for effecting one of the machining cuts along a non-parallel path at a predetermined angle to the cuts effected by the other cutters in the direction of movement of the work table. The particular work piece shown in Fig. 1 requires that the cut effected by the cutter spindle 34 on the rear horizontally movable head 32 be made at a predetermined angle to the other cuts effected by the cutters on the other spindles. This angular cutting operation is accomplished by moving the rear spindle head 32 horizontally along the rail 26 in direction transverse to the direction of table movement and in synchronism with the longitudinal movement of the table.

To insure the highest degree of accuracy, the transverse feeding movement of the spindle is accomplished in this machine by means of a train of transmission gearing that is actuated by the table in the course of its movement and that operates the feeding screw 44 which moves the head 32 along the rail 26. The speed and direction of the transverse movement, and consequently the inclination at which the cut is effected relative to the cuts resulting from operation of cutters on the other spindles, may be adjusted by means of suitable speed changing and reversing gearing incorporated in the transmission train.

Movement of the work table 22 longitudinally of the bed 21 in executing feeding strokes, is effected by means of a table driving electric motor 64 mounted on the right end of the bed and operatively connected by means of the usual rate changing and reversing gearing to turn a table feeding screw 65 that is rotatably carried by the table and that has threaded engagement with a cooperating stationary nut fixed in the bed 21.

Figure 12:
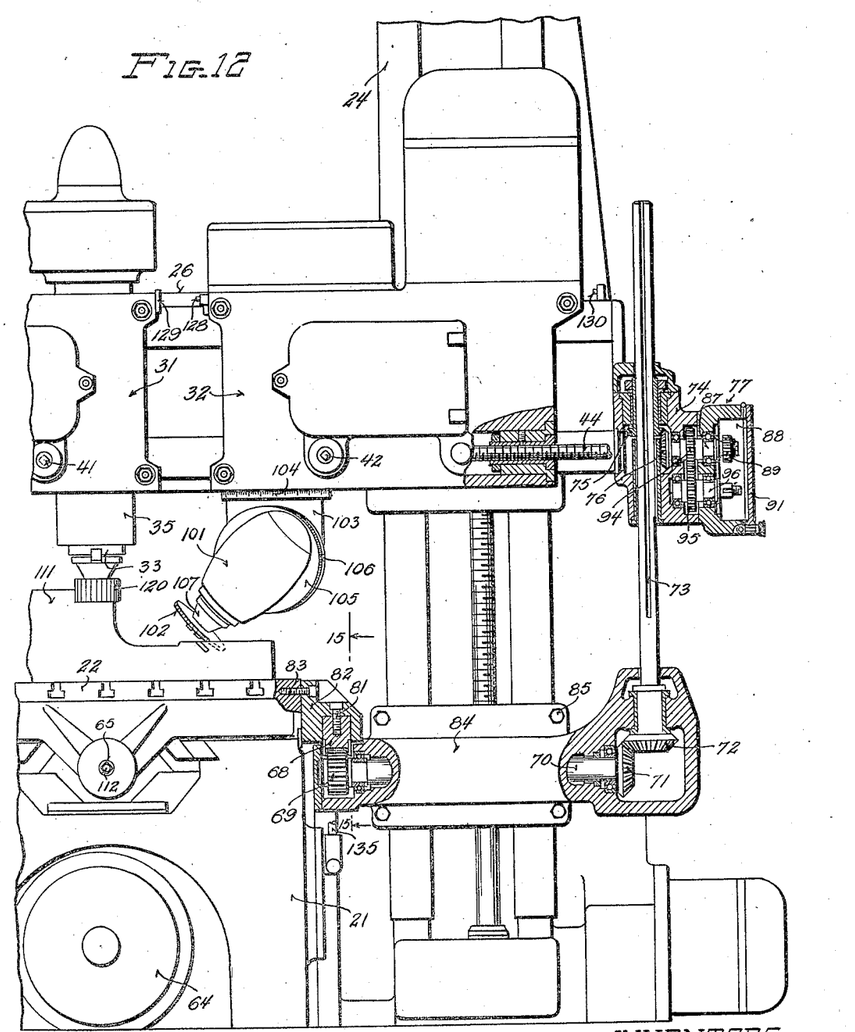
Fig. 12 is a fragmentary enlarged view in right end elevation of the rear column of the machine, showing the transversely adjustable spindle head provided with a universally adjustable spindle mounting, parts having been broken away to show the transmission mechanism.
Figure 15:
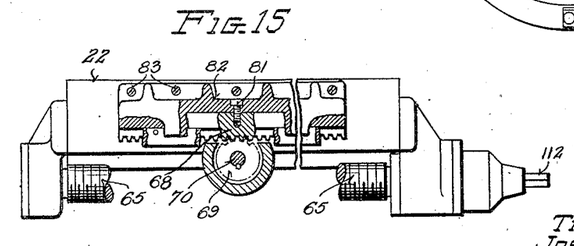
Fig. 15 is a fragmentary view of the rear edge of the work table and adjacent parts of the transverse driving mechanism, taken partly in vertical section on the line 15—15 in Fig. 12.

Power for effecting the transverse feeding movement of the spindle head 32 is derived from movement of the table 22 and is transmitted to the gear train mechanism by means of a toothed rack 68 that is secured to the rear edge of the table and has meshing engagement with a cooperating pinion 69, as shown in Figs. 12 and 15. The pinion 69 is fixed on the forward end of a horizontal shaft 70, the other end of which carries a bevel gear 71 meshing with a complementary bevel gear 72 fixed on the lower end of a vertically disposed splined shaft 73. The splined shaft 73 extends upward through a gear housing 74 fixed on the rear end of the rail 26 and has splined connection with a bevel gear 75 rotatably mounted within the housing, the arrangement being such that vertical movement of the rail 26 and the housing 74 will not interfere with the driving connection.

The bevel gear 75 in the housing 74 meshes with a complementary bevel gear 76 from which power is transmitted through a rate changing and reversing pick-off gear mechanism 77 which drives the head traversing screw 44 at the rate and in the direction required to effect the desired direction and extent of inclination of the cut being taken in the work piece.

Figure 13:
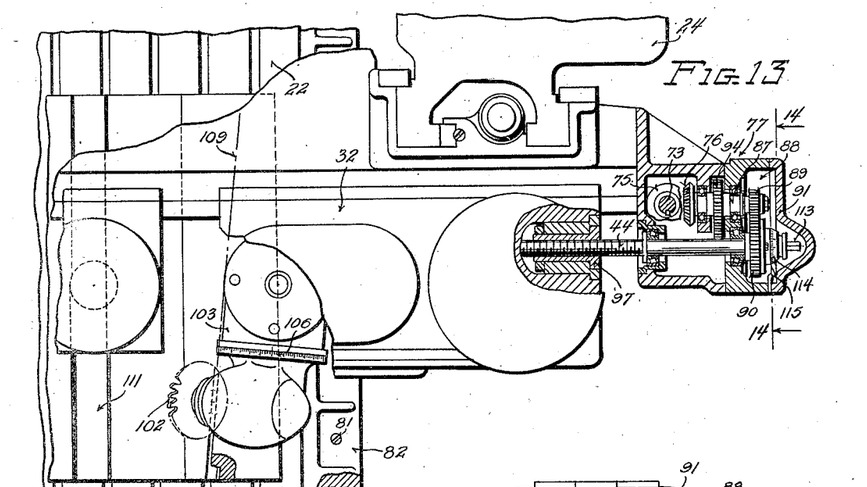
Fig. 13 is a plan view of the portion of the machine shown in Fig. 12 with parts broken away to show the driving gearing.

As appears in Figs. 12, 13 and 15, the rack 68 which drives the transverse feed mechanism is in the form of a rectangular bar extending substantially from end to end of the table. As best shown in Fig. 15, the rack bar 68 is attached by cap screws 81 to a bracket 82 which is in turn secured by cap screws 83 to the rear edge of the table. The cooperating pinion 69 is rotatably supported by means of its shaft 70 journalled in a tubular bracket 84 that is secured in proper position on the face of the column 24 by clamp bolts 85, the rearwardly extending end of the bracket being enlarged to form a housing for the bevel gears 71 and 72 and arranged to constitute a bearing in which the vertical shaft 73 is rotatably mounted.

Figure 14:
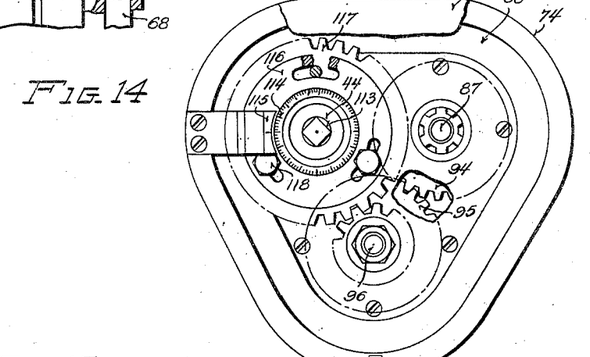
Fig. 14 is an enlarged view in rear elevation of the spindle traversing gearing, partly in vertical section taken on the line 14—14 in Fig. 13.

Referring now to Figs. 12, 13 and 14, it will be seen that the bevel gear 76 which is driven from the shaft 73 by means of the splined bevel gear 75, is rotatably supported by a horizontal stub shaft 87 that is rotatably mounted in the housing 74. The stub shaft 87 projects at its rearward end into a gear compartment 88 and is shaped to receive a pick-off gear 89. As best shown in Fig. 13, the gear 89 is arranged to mesh with a complementary pick-off gear 90 fitted on the rearwardly projecting end of the transverse feed screw 44 which is rotatably mounted in the rail 26 and likewise projects into the compartment 88, the gearing being accessible upon opening a door 91 hinged to the housing 74 at the rear thereof. It is apparent that the rate of transverse movement of the spindle head 32 relative to the table 22 is determined by the ratio of the gearing in the transmission train, and that it may be adjusted by removing the gears 89 and 90 and substituting another pair of complementary gears having the required different ratio.

For determining the direction in which the angular cut will be made relative to the straight cuts on the work piece, the pick-off gear mechanism 77 is arranged to effect a reversing action, as previously mentioned. Referring particularly to Fig. 12, it will be seen that the stub shaft 87 has fixed thereon a spur gear 94 that has meshing engagement with a similar spur gear 95 fixed on another stub shaft 96 journalled in the housing 74 below the shaft 87. The stub shaft 96 likewise projects rearwardly into the gear compartment 88 and is similarly arranged to receive a pick-off gear, the shaft 96 being rotated in direction opposite to the shaft 87 through action of the interconnecting gear train. As shown in Fig. 14, the shafts 87 and 96 are positioned equi-distant from the traversing screw shaft 44 and serve as alternate, oppositely rotating driving elements, either one of which may be utilized by applying to it the pick-off gear 89 which meshes with the complementary gear 90 in either position to drive it in either direction selectively.

As appears in Fig. 13, the rotatable traversing screw 44 has threaded engagement with a cooperating nut 97 fixed in the body of the spindle head 32, the arrangement being such that when the screw 44 is turned in the nut, the head 32 is traversed along the rail 26 in the usual manner. In order that the traversing movement of the head and spindle, and consequently the angular cutting action, may be effected with the highest degree of accuracy, the entire transmission mechanism from the rack and pinion associated with the table to the screw and nut mechanism, is so fitted as to have the least possible backlash or lost motion in its action.

This arrangement of gearing provides for moving the head 32 along the rail 26 transversely of the table in accordance with the longitudinal feeding movement of the table. Accordingly, the machining cut effected by a cutter on the spindle head 32 will be disposed at an angle to the cuts effected by the other cutters of the machine, the angle of the cut being determined by the proportion of the transverse movement of the head to the longitudinal movement of the table. Since the direction and rate of movement of the head 32 is established by the selection and positioning of the pick-off gearing in the mechanism 77, any desired change in the angle of cut may be effected readily by exchanging the pick-off gears 89 and 90 for others having the required ratio to effect the desired angle of cutting action. Furthermore, the direction of the angular cut may be selected by choosing between the shafts 87 and 96 as the driving element for the gearing.

Although the particular machine tool illustrated is arranged as a matter of convenience, to utilize pick-off change gears in the drive for effecting the angular cutting action, it is to be understood that any other speed changing and reversing mechanism might be substituted, providing that it is capable of transmitting motion with the degree of certainty required to effect the desired degree of accuracy in the machining operation. Furthermore, although the transverse cutter feeding mechanism is shown mounted on the rear column and associated with the rail cutter head, it is to be understood that this mechanism might well be associated with the forward spindle head, or for that matter similar mechanisms might be arranged for traversing both heads simultaneously at the same or different rates and in the same or opposite directions.

In the particular embodiment of the invention shown in Fig. 12, the rear cutter head 32 is equipped with a universally adjustable cutter spindle carrying structure 101 that is arranged to present a milling cutter 102 at any desired angle in either a horizontal or a vertical plane. As shown, the cutter supporting structure includes a circular universal swivel portion 103 that is rotatably mounted on the base of the head 32 and is arranged to be pivoted about a vertical axis to any angular position in a horizontal plane, as indicated by graduations 104 about its periphery. The universal swivel portion 103 carries a swiveling spindle head 105 pivotally mounted thereon for movement about a horizontal axis to any angular position in a vertical plane, as indicated by graduations 106 on the periphery of the head. The spindle head 105 has journalled therein a cutter spindle 107 that carries the milling cutter 102 and is operatively connected to be driven from the actuating mechanism in the head structure 32 by means of bevel gearing or the like, in well known manner. In adjusting the position of the cutter 102 before starting an angular cut, the spindle head 105 may first be turned to set the cutter 102 at the desired angle to the vertical as indicated by the graduations 106, and clamped in well known manner. The universal swivel portion 103 may then be turned to and clamped in position to present the cutter 102 parallel with the angular path to be followed in the machining operation, as indicated by the graduations 104, the path being represented by the dot-dash line 109 in Fig. 13.

In starting a cut in a work piece such as a piece of material 111 shown in Figs. 12 and 13, the table 22 is first moved to the position in which the leading edge of the work piece 111 is closely adjacent to the cutter 102, the final adjustment being effected manually, if desired, by actuating a crank or the like applied to the squared end 112 of the table driving screw 65. The cutter 102 may then be adjusted to effect the desired depth of cut by adjusting the vertical position of the cross rail 26 upon the columns 23 and 24. The pick-off gear 89 is then removed from the transverse feed rate changing and reversing mechanism 77 and a crank or the like applied to the squared end 113 of the transverse feed screw 44 for turning it to adjust the head 32 along the rail 26 to position the cutter 102 at the exact point at which it is desired to start the cut in the work piece. The extent of movement of the head 32 along the rail 26 may be measured by reference to a micrometer dial 114 fixed on the end of the screw shaft 44 and arranged to cooperate with a zero mark or indicator device 115 secured to the housing 74, as shown in Fig. 14. The pick-off gear 89 is then placed on either the shaft 87 or the shaft 96 in accordance with the direction in which the angular cut is to be made.

Since neither the table 22 nor the spindle head 32 may be moved after the cutter has been set at the starting position, the various shafts cannot be turned to bring the teeth of the gears 89 and 90 into meshing alignment. To overcome this difficulty, the gear 90 is formed in two parts, a supporting hub element 116 that is fitted on the end of the screw shaft 44 and a toothed rim portion 117 arranged for angular movement relative to the hub. In effecting meshing engagement between the pick-off gear 89 and the gear 90, the rim portion 117 is turned on the hub 116 until its teeth come into alignment with the teeth of the gear 89 whereupon the gear 89 may be moved endwise into position and secured to the end of its driving shaft. The rim 117 of the gear 90 is then secured to the hub 116 by tightening clamping bolts 118, the meshing of the gearing being thus completed without disturbing the position of the cutter relative to the work piece.

A suitable milling cutter 120 fitted in the spindle 33 of the spindle head 31 may be positioned relative to the work piece 111 horizontally by moving the head along the rail, and vertically by adjusting the quill 35 within the head, in such manner that it will effect a cutting operation along a path in the direction of movement of the table 21 and in a predetermined position on the work piece relative to the angular cut being effected by the milling cutter 102 carried by the head 32.

To this end, the front spindle head 31 may be adjusted along the rail 26 with the aid of the lead screw 43, which differs in arrangement from the screw 44 associated with the head 32 in that it is fixed to the rail. Movement of the head 31 is effected by actuating a crank or the like applied to the squared end of an actuating shaft 126 projecting from the front of the head, as shown in Fig. 1, and operatively connected to turn a nut mounted in the head structure and having threaded engagement with the screw 43.

Since it is possible that the forward spindle head 31 may be moved to a position in which it will interfere with transverse movement of the head 32 in the course of an angular cutting operation, the head 32 is provided with a limit switch arrangement 128 that is operatively connected with the control of the drive motor 64 and functions to stop the motor when the head 32 is moved to within a predetermined limiting distance from the other head, at which point the switch engages an actuating stop member 129 on the head 31. By this arrangement, if the head 31 is positioned too close to the head 32 and the latter approaches the former during an angular cutting operation, the limit switch 128 will be actuated to stop further feeding movement of the table before collision occurs between the two heads.

A similar limit switch 130 is provided on the rear of the rail 26 in position to be engaged by the head 32 in the event the head approaches too closely to the end of the rail. Other limit switches, not shown, may be provided on the column 24 to limit the extent of movement of the rail 26 vertically along the columns.

Whenever a change is made in the angle at which the cutter 102 carried by the head 32 is to be fed relative to the work piece 111, the angularly adjustable head 101 is likewise adjusted to correspond with the new angle of cut in order that the plane of rotation of the cutter 102 may include the line of the cutting action. However, in the event that the angular cut is being effected by a cutter on a vertically disposed spindle such as a cutter 133 on the vertical spindle 34 shown associated with the head 32 in Fig. 1, the cutting periphery of the cutter follows the angular path of cut without the necessity of any adjustment of its angular position.

Figures 4, 5, 6, 7:
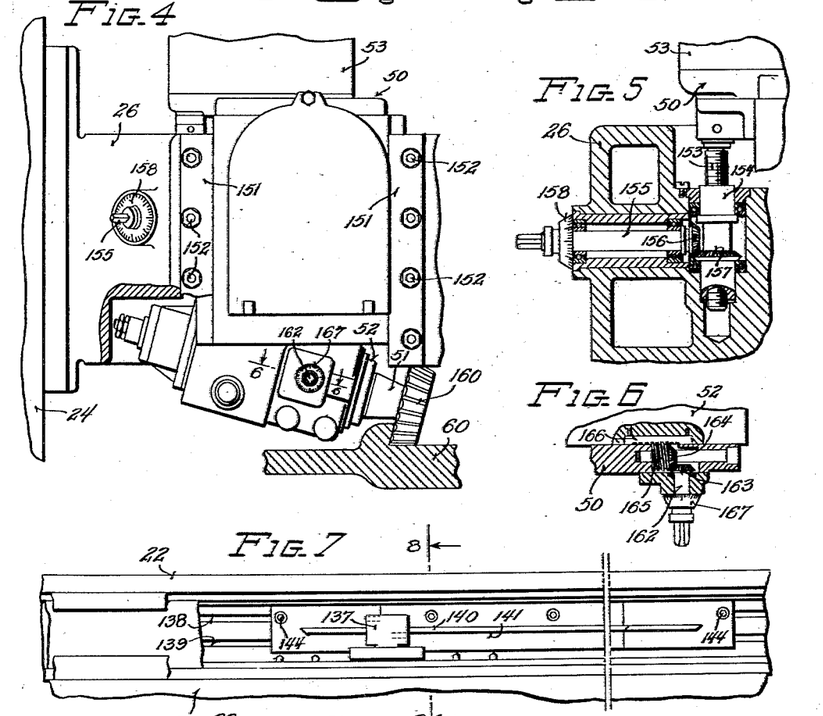
Fig. 4 is a fragmentary view in left side elevation of part of the spindle carrying rail, showing the vertically adjustable spindle head.
Fig. 5 is a fragmentary view in vertical section, taken on the line 5—5 in Fig. 3 showing the mechanism for effecting vertical adjustment of the spindle head.
Fig. 6 is a detailed sectional view taken on the line 6—6 in Fig. 4 and showing means for adjusting the position of the quill carrying the angularly mounted spindle.
Fig. 7 is a fragmentary view in front elevation of the edge of the work supporting table as seen in Fig. 2, with parts broken away to show the improved tripping mechanism.
Figure 8:
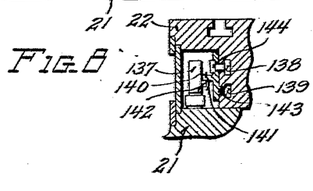
Fig. 8 is a fragmentary detailed view in vertical section of the tripping mechanism, taken on the line 8—8 in Fig. 7.

Movement of the work supporting table 22 longitudinally of the bed 21 is under the control of manually operable levers 135 one of which is positioned at each side of the bed, as best shown in Fig. 1. These levers operate in well known manner to effect movement of the table in either direction at either feed rate or rapid traverse rate selectively. Control of the table driving mechanism may also be effected automatically in response to movement of the table, by tripping mechanism including a tripping post 137 of the usual type mounted vertically in the bed 21 adjacent to the front edge of the table 22, as shown in Figs. 7 and 8. The tripping post 137 is so connected with the control mechanism that movement of the post to its upper position effects movement of the table at rapid traverse rate while movement of the post to its lower position results in feed rate movement of the table, the direction of table movement being controlled by turning the post 137 in one or the other direction. Movement of the post 137 in controlling the table, may be effected in the usual manner, by trip dogs mounted in T-slots 138 and 139 formed in the forward edge of the table.

In the particular control system utilized in this machine, arrangements are provided for preventing the control mechanism from being shifted accidentally into the rapid traverse position during the course of a cutting stroke. For this purpose, the usual momentarily acting feed rate trip dog is replaced by an elongated controlling dog or member 140 shown in Fig. 7. The member 140 functions to engage the tripping post 137 in the manner of a feed rate trip dog, to move it down to feed rate position as indicated in Fig. 8. However, instead of passing out of engagement with the tripping post during the course of the feeding movement, as would be the case with usual feed rate trip dog, the controlling member 140 is provided with an elongated control surface or ledge 141 which remains in engagement with a cooperating lug 142 on the trip post 137 in manner to hold the post down in feed position throughout the feeding stroke, thereby preventing unintentional shifting of the control mechanism into rapid traverse position. As appears in Fig. 8, the control element 140 is provided at its back with a lug 143 that fits into the lower T-slot 139 and it is secured to the table by bolts 144 fitted in the upper T-slot 138 and passing through holes in an upwardly extending portion of the control element.

Figure 3:
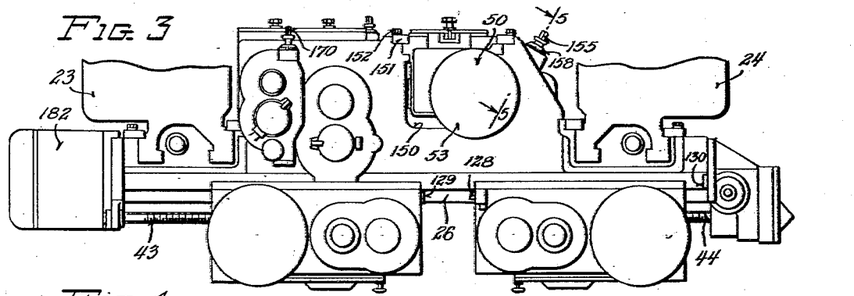
Fig. 3 is a plan view of the spindle carrying rail of the machine, showing parts of the supporting columns.

Referring now to Figs. 3 and 4, it will be seen that the vertically adjustable spindle head 50 is fitted into a recess 150 in the expanded portion of the rail 26 which extends to the left between the columns 23 and 24, the head being held in position by gibs 151 secured by bolts 152 in manner to permit vertical sliding movement of the head relative to the rail. As shown in Fig. 5, the head 50 has attached to it an elevating screw 153 that has threaded engagement with a cooperating nut 154 rotatably mounted in the structure of the rail 26. For elevating or lowering the head, the nut 154 may be turned by means of a crank or the like applied to the squared end of an actuating shaft 155 that protrudes from the rail at the left rear corner of the expanded portion thereof. The actuating shaft 155 is provided at its inner end with a bevel gear 156 that meshes with a cooperating bevel gear 157 on the rotatable nut 154, the arrangement being such that when the shaft 155 is turned, the head 50 will be raised or lowered by an amount indicated by a micrometer dial 158 fixed on the outer end of the shaft.

The position of a milling cutter 160 mounted on the angularly positioned spindle 51, relative to the work piece 60 may be adjusted by adjusting the head 50 vertically in combination with axial adjustment of the spindle 51 by means of its spindle quill 52.

Adjustment of the quill 52 is accomplished by the arrangement shown in Fig. 6 by means of a crank or the like applied to the squared end of an actuating shaft 162 which protrudes from the head 50 and is provided at its inner end with a bevel pinion 163 which meshes with a similar bevel pinion 164 on a driving screw 165. As shown, the screw 165 has meshing engagement with the teeth of a rack 166 fitted in one side of the quill 52, the arrangement being such that when the shaft 162 is turned, the quill will be moved in or out in accordance with the indication of a micrometer dial 167 on the outer end of the shaft.

Figure 10:
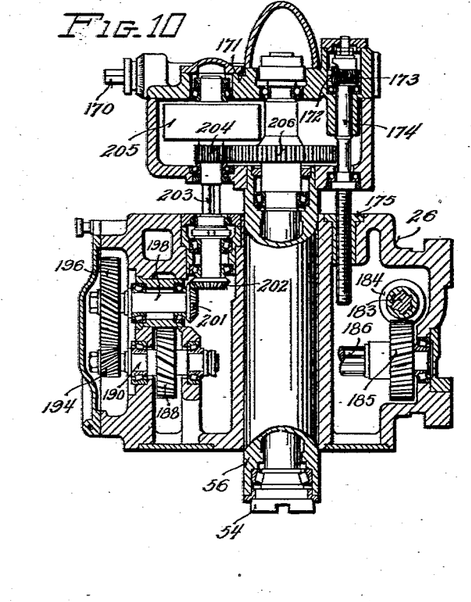
Fig. 10 is a view in vertical section on the line 10—10 in Fig. 9, showing details of the spindle driving mechanism.
Figure 11:
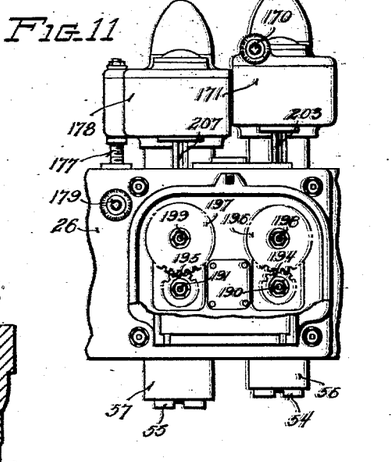
Fig. 11 is a fragmentary view in left side elevation, showing the portion of the rail carrying the spindle quills mounted directly therein.

The two spindles 54 and 55 which are supported by the quills 56 and 57 directly in the body of the rail 26, are likewise arranged for axial vertical adjustment to position cutters carried by them precisely relative to the work piece on the table 22. As appears in Figs. 3, 10 and 11, the quill 56 carries at its upper enlarged end a horizontally projecting actuating shaft 170 presenting a squared end for receiving a crank or the like. As shown in Fig. 10, the shaft 170 is rotatably mounted in an enlarged head portion 171 of the quill 56 and is provided at its inner end with a worm 172 that meshes with a cooperating worm wheel 173 on the upper end of a vertically disposed screw shaft 174. The shaft 174 is rotatably journalled in the head 171 and is threaded in a nut 175 fixed in the body of the rail 26, the arrangement being such that when the actuating shaft 170 is turned the screw 174 operates to move the quill 56 up or down within its cooperating slidable bearing surface in the rail.

The quill 57 carrying the spindle 55 is likewise provided with a somewhat similar arrangement, but in this instance the screw shaft 177 is fixed in an enlarged head 178 at the upper end of the quill, the screw shaft projecting downward into the body of the rail 26. Actuation of the quill is effected by means of a crank or the like applied to the squared end of an actuating shaft 179 projecting from the rail, the shaft being operatively connected to turn a nut rotatably mounted in the rail and having threaded engagement with the screw 177.

Figure 9:
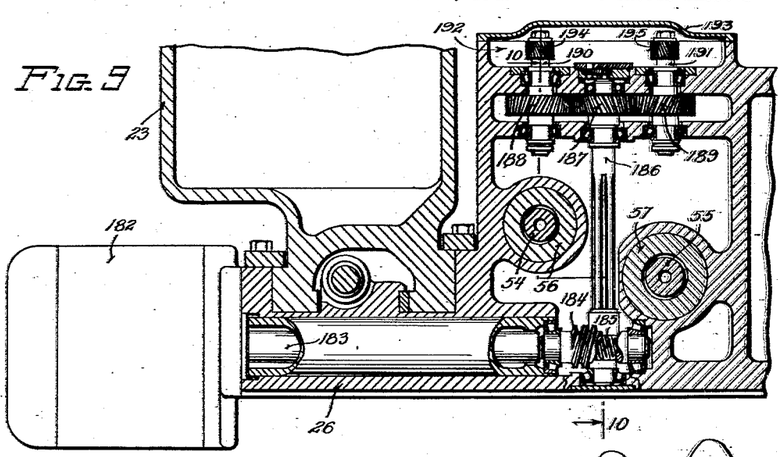
Fig. 9 is a fragmentary view taken in horizontal section on the line 9—9 in Fig. 1 showing the mechanism for driving the spindles mounted in the vertically adjustable rail.

Both the tool spindle 54 and the tool spindle 55 in the quills 56 and 57, respectively, are driven from the same power source constituted by an electric motor 182 mounted on the forward end of the rail 26, as shown in the drawing. Referring particularly to Fig. 9, the motor 182 is provided with a long driving shaft 183 disposed longitudinally within the rail 26 and provided at its inner end with a worm 184 which meshes with a worm wheel 185 on a shaft 186 extending transversely of the rail 26. As appears in Figs. 9 and 11, the shaft 186 is provided at its other end with a pinion 187 that meshes with similar pinions 188 and 189 mounted on stub shafts 190 and 191, respectively, for driving the two spindles 54 and 55. The stub shafts 190 and 191 project into a change gear compartment 192 at the left side of the rail, which is closed by a hinged cover 193. As shown, the ends of the shafts 190 and 191 are fitted to receive pick-off gears 194 and 195, respectively, which mesh with complementary pick-off gears 196 and 197 on the ends of shafts 198 and 199.

As appears in Fig. 10, the shaft 198 is provided at its other end with a bevel pinion 201 that meshes with a similar bevel pinion 202 on a vertically disposed splined shaft 203 which is rotatably mounted in the body of the rail 26. The splined shaft 203 has sliding engagement with an internally splined pinion 204 rotatably mounted within the head 171 and having associated with it a flywheel 205, the arrangement being such that the head 171 and quill 56 may be moved vertically without interfering with the driving connection. As shown, the pinion 204 meshes with a gear wheel 206 fixed on the tool spindle 54 for rotating it to drive a cutter carried thereby, the speed of rotation of the cutter being determined by the ratio of the pick-off gears 194 and 196.

The connection for driving the other spindle 55 is similar to that shown and described in regard to the spindle 54, the driven pick-off gear 197 and its shaft 199 being connected by bevel gearing to a vertically disposed splined shaft 207 extending upward into the head 178 on the quill 57. Within the head 178 the splined shaft 207 engages gearing similar to that shown within the head 171 by means of which power is transmitted at the rate established by the ratio of the pick-off gears 195 and 197, to the tool carrying spindle 55.

From the foregoing description of the multiple spindle milling machine herein set forth to exemplify the present invention it will be apparent that there has been provided an improved machine tool especially adapted to perform a multiplicity of machining operations upon a work piece simultaneously with a high degree of efficiency and accuracy and with various machining cuts arranged in desired angular relationship.

Although the illustrative embodiment of the invention herein set forth has been described in detail by way of disclosure of a practical exemplifying structure, it is to be understood that the particular apparatus herein described is intended to be illustrative only and that various characteristics of the invention may be incorporated in other structural forms without departing from the spirit and scope of the invention as defined in the subjoined claims.

The principles of the invention having now been fully explained in the foregoing description of embodying apparatus, we hereby claim as our invention:

1. In a milling machine of the rail type, a bed, a work supporting table movably mounted on said bed, uprights carried by said bed at the respective sides of said work supporting table, a rail slidably mounted on said uprights for adjustment vertically relative to said table, a spindle quill slidably mounted in said rail for adjustment vertically relative thereto, a tool carrying spindle rotatably mounted in said quill, a plurality of spindle heads slidably mounted on said rail for horizontal movement therealong, a tool carrying spindle rotatably mounted in each of said spindle heads, power operated means arranged to effect feeding movement of said work supporting table, means operatively connected to cause movement of one of said spindle heads along said rail as a result of feeding movement of said table, and limit control means associated with said power actuated head and operative to stop feeding movement of said work supporting table upon said power actuated head approaching another of said spindle heads on said rail to within a predetermined minimum distance.

2. In a milling machine, a base, a work supporting table movably mounted on said base, a cutter supporting structure carried by said base, a plurality of milling cutters carried by said structure, means for moving each of said cutters relative to the other, means to correlate the relative movement of said cutters with the movement of said work supporting table to effect milling cuts along non-parallel paths of predetermined relationship upon a work piece carried by said table, and limit control means arranged to function in response to movement of said cutters to within a predetermined limiting distance of each other and operating to stop said movement of said work supporting table, whereby collision between said cutters is prevented.

3. In a milling machine, a cutter supporting structure, a plurality of cutter carrying heads movably mounted on said cutter supporting structure, cutter spindles rotatably mounted in said cutter carrying heads respectively, a work supporting member movably mounted in cooperating relationship with said cutter spindles, means arranged to move each of said cutter heads relative to said supporting structure, means connected to be actuated by said work supporting member in the course of its movement and operative to effect movement of one of said heads, and limit control mechanism associated with said cutter heads and operative to stop movement of said work supporting member upon the approach of said heads to within a predetermined minimum distance, whereby collision between said heads may be avoided.

4. In a milling machine, a base, a work supporting table slidably mounted on said base, power operated means in said base arranged to effect feeding movement of said table, control mechanism for said power operated means including a trip post movable to two positions, a cooperating trip dog carried by said table and operative to retain said trip post in one position throughout a feeding movement, columns upstanding at the respective sides of said work supporting table, a rail carried by said columns, a spindle quill mounted directly in said rail for axial adjustment only relative thereto, a tool carrying spindle rotatably mounted in said spindle quill, a plurality of spindle heads slidably mounted on said rail for movement therealong transversely of said table, tool carrying spindles rotatably mounted in said spindle heads, a transmission mechanism arranged to be driven by said table in the course of its movement and operatively connected to move one of said spindle heads in correlated relationship with said table for effecting angular cutting, speed changing and reversing mechanism associated with said transmission mechanism and operative to establish the direction and degree of said angular cutting operation, and control mechanism associated with said spindle heads and operative to prevent collision of said heads by stopping said power operated means when said heads approach each other to within a predetermined minimum distance.

5. In a milling machine, a base, a work supporting table movably mounted on said base, an electric motor operatively connected to drive said table in feeding movement, a spindle supporting head mounted for movement transversely of said table, a transmission mechanism arranged to be driven by said table in the course of its movement and operatively connected to move said spindle head, a limit switch associated with said head and operative to deenergize said table driving motor upon said head approaching close to contact with another part of said machine.

6. In a milling machine of the rail type, a bed, a work supporting table movably mounted on said bed, a rail carried by said bed above said table, a plurality of spindle heads movably mounted on said rail, power driven means arranged to drive said table, mechanism operated by movement of said table to effect movement of one of said heads along said rail, and limit control means associated with said power driven head and operative to stop said power driven means upon said driven head moving to within a predetermined distance of another of said heads on said rail.

7. In a milling machine of the rail type, a bed, a work supporting table movably mounted on said bed, a rail carried by said bed above said table, a plurality of spindle heads movably mounted on said rail, power driven means arranged to actuate said work supporting table, means driven by movement of said table and operatively connected to move one of said spindle heads, and control means associated with said driven spindle head and operative to stop said table driving power means when said driven head approaches another spindle head to within a predetermined distance, whereby danger of driving said power driven head into engagement with another head is obviated.

THEODORE TRECKER.
JOSEPH B. ARMITAGE.

REFERENCES CITED

The following references are of record in the file of this patent:

UNITED STATES PATENTS

| Number | Name | Date |
| --- | --- | --- |
| 1,873,375 | Forward et al. | Aug. 23, 1932 |
| 2,149,791 | Saupe | Mar. 7, 1939 |
| 565,642 | Sweet | Aug. 11, 1896 |
| 2,081,288 | Armitage | May 25, 1937 |
| 1,602,860 | Sleeper | Oct. 12, 1926 |
| 1,838,816 | Flickett et al. | Dec. 29, 1931 |
| 2,259,489 | Renier | Oct. 21, 1941 |
| 2,263,928 | Marsilius et al. | Nov. 25, 1941 |